United States Patent [19]

Ro et al.

[11] Patent Number: 5,792,720

[45] Date of Patent: Aug. 11, 1998

[54] METHOD AND APPARATUS FOR MANUFACTURING TEDA-IMPREGNATED ACTIVE CARBON IN FLUIDIZED BED TYPE ABSORBING TOWER BY GENERATING TEDA VAPOR BY MEANS OF HOT AIR

[75] Inventors: Seung-Gy Ro; Hoo-Kun Lee, both of Daejeon-Si, Rep. of Korea

[73] Assignee: Korea Atomic Energy Research Institute, Daejeon-Si, Rep. of Korea

[21] Appl. No.: 572,700

[22] Filed: Dec. 14, 1995

[30] Foreign Application Priority Data

Jun. 2, 1995 [KR] Rep. of Korea ............... 95-14642

[51] Int. Cl.[6] ............... B01J 21/18; B01J 27/24; B01J 20/02; C09C 1/56
[52] U.S. Cl. ............... 502/180; 502/200; 502/416; 502/417; 502/430; 502/431; 423/460
[58] Field of Search ............... 502/180, 200, 502/416, 417, 430, 431; 423/460

[56] References Cited

U.S. PATENT DOCUMENTS

| | | | |
|---|---|---|---|
| 2,818,323 | 12/1957 | Haensel | 23/2 |
| 2,920,050 | 1/1960 | Blacet et al. | 252/447 |
| 2,920,051 | 1/1960 | Wilg et al. | 252/447 |
| 2,963,441 | 12/1960 | Dolian et al. | 252/190 |
| 3,453,807 | 7/1969 | Taylor | 55/71 |
| 3,516,791 | 6/1970 | Evans et al. | 502/180 |
| 3,541,025 | 11/1970 | Oda et al. | 502/431 |
| 3,565,827 | 2/1971 | Friday | 502/431 |
| 4,111,833 | 9/1978 | Evans | 502/417 |
| 4,531,953 | 7/1985 | Groose et al. | 55/74 |
| 4,802,898 | 2/1989 | Tolles | 55/71 |
| 5,063,196 | 11/1991 | Doughty et al. | 502/180 |
| 5,124,292 | 6/1992 | Larsen et al. | 502/38 |
| 5,145,820 | 9/1992 | Liang et al. | 502/401 |
| 5,462,908 | 10/1995 | Liang et al. | 502/401 |
| 5,719,093 | 2/1998 | Park et al. | 502/44 |

*Primary Examiner*—Glenn Caldarola
*Assistant Examiner*—Patricia L. Hailey
*Attorney, Agent, or Firm*—Armstrong, Westerman, Hattori, McLeland & Naughton

[57] ABSTRACT

A method and an apparatus using a fluidized bed type adsorbing tower for manufacturing a TEDA-impregnated active carbon which is used for removing toxic materials from a fluid. A base active carbon is dried to remove the water component, and the dried active carbon is filled into the fluidizing type adsorbing tower and to above a sieve plate. A TEDA reagent is injected into a TEDA vapor generating vessel. A heated air is supplied into the TEDA vapor generating vessel so as to generate a TEDA vapor mixed with the heated air. The heated air mixed with the TEDA vapor is supplied into the lower portion of the fluidized bed type adsorbing tower so as to make the base active carbon fluidized. Thus the TEDA vapor is impregnated into the active carbon within the fluidized carbon bed.

2 Claims, 1 Drawing Sheet ature level.

METHOD AND APPARATUS FOR MANUFACTURING TEDA-IMPREGNATED ACTIVE CARBON IN FLUIDIZED BED TYPE ABSORBING TOWER BY GENERATING TEDA VAPOR BY MEANS OF HOT AIR

FIELD OF THE INVENTION

The present invention relates to a method and an apparatus using a fluidized bed type adsorbing tower for manufacturing a TEDA-impregnated active carbon which is used for removing toxic materials from a fluid.

BACKGROUND OF THE INVENTION

An impregnated active carbon is used in: military gas masks for removing toxic gases, apparatuses for adsorping toxic gases in the general industrial fields, off-gas treatment systems for adsorbing an organic radioactive iodide in a nuclear reactor; apparatuses for purifying contaminated water, and air purifiers used in semiconductor manufacturing and in biotechnology engineering science. Further, impregnated active carbon is used in the petroleum industries as a catalyst.

Particularly, among gaseous radioactive materials, radioactive iodine exists as organic iodide and inorganic phases. The radioactive organic iodide exists mainly in the form of methyl iodide ($CH_3I$), and has a high volatility.

Therefore, it is difficult to remove the organic iodide through a physical adsorption by non-impregnated base active carbon. In order to overcome this drawback, the base active carbon should be impregnated with a TEDA(Tri-Ethylene Diamine) which has high volatility. The TEDA-impregnated active carbon removes the radioactive organic iodide through chemical adsorption.

The conventional method for manufacturing impregnated active carbon is carried out in the following manner. That is, in order to impregnate a proper material into the active carbon. Then impregnated material is first dissolved in an aqueous solution, then a process of impregnating the material into the active carbon is carried out for a time, and then, the immersed impregnated active carbon is recovered and dried to remove the water component of the solution. The drying apparatus consists of a fluidized bed type drier, or a rotary kiln.

However, in manufacturing the impregnated active carbon in the above described method, the impregnant is dissolved in a solution, then a base active carbon is immersed in the solution. Then, after elapse of a certain period of time, the impregnated active carbon is dried to remove the water component.

Therefore, the cost for the manufacturing apparatus is high, and the operating procedure is complicated, with the result that the manufacturing cost for the impregnated active carbon becomes high. Meanwhile, there is another method for manufacturing impregnated active carbon. That is, by utilizing the subliming property of TEDA, active carbon is filled into a vessel of a certain size, and then, TEDA effectively is allowed to sublime by reducing the pressure. Thus, TEDA is made diffuse into a vapor and the vapor allowed to diffuse into the active carbon over a long period, thereby manufacturing the impregnated active carbon.

In the above described method, the cost of the pressure reducing apparatus is high, and the manufacturing time period is extended. Further, a fixed bed or a vessel of a certain size is used to fill the active carbon and to carry out the impregnation. Therefore, TEDA is not uniformly impregnated into the active carbon, and the impregnating distribution is different depending on the height of the active carbon bed.

SUMMARY OF THE INVENTION

The present invention is intended to overcome the above described disadvantages of the conventional techniques.

Therefore, it is the object of the present invention to provide a method and an apparatus for manufacturing an impregnated active carbon in a fluidized bed type adsorbing tower by utilizing the volatility of the impregnant, in which TEDA is put into a constant temperature TEDA vapor generating vessel, and a heated air is supplied from the above, so that the evaporating rate of TEDA would be increased owing to the diffusion and convection effects, and that the TEDA vapor and the heated air would be contacted with the active carbon within the fluidized bed, thereby making it possible to uniformly impregnate the active carbon within a short period of time.

Thus, according to the dissolved present invention, the solution containing the impregnant is not used, and therefore, the process of immersing the active carbon in the aqueous solution is not required. Further, the container for containing the solution for immersing the active carbon is not required, and the apparatus for filtering the residue solution is not required. Further, the means for transporting the impregnating aqueous solution and a drying facility for the impregnated active carbon are not required. Further, the disadvantage of injecting a high temperature hot air for a long period for drying the water is avoided. Further, the long time period for evaporating the TEDA under a reduced pressure in the fixed bed is not required. Further, the non-uniform impregnation can be overcome.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
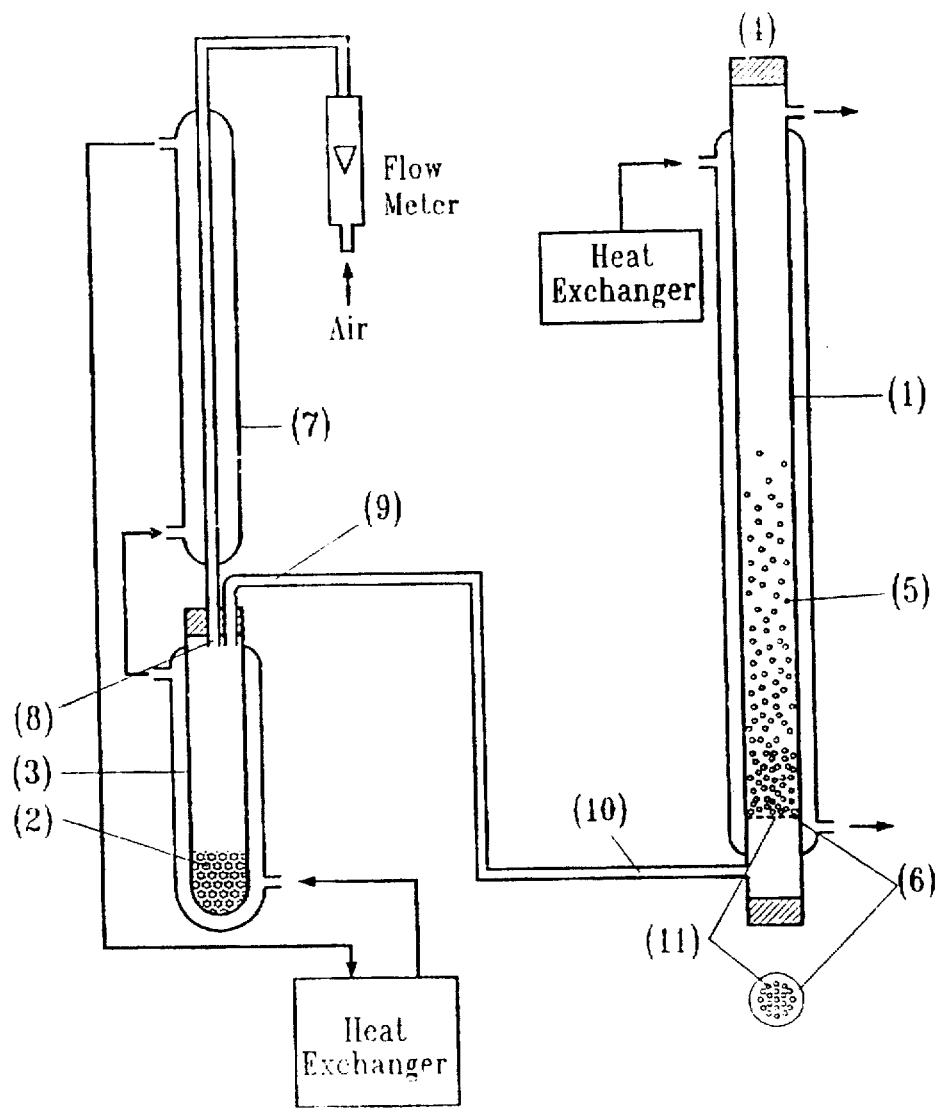
FIG. 1 is a sectional view of the impregnated active carbon manufacturing apparatus including a fluidized bed type adsorbing tower according to the present invention.

A fluidized bed type adsorbing tower 1 which is a main body of the impregnating apparatus of the present invention consists of a dual tube for maintaining the temperature at a constant level. That is, heat is supplied from the outside so as to maintain the temperature of the fluidized bed type adsorbing tower 1 at a constant level.

A TEDA 2 to be impregnated is placed into a TEDA vapor generating vessel 3 which consists also of a dual walled tube. Then heat is supplied from the outside so as to maintain the TEDA vapor generating vessel 3 at a constant temperature level.

A base active carbon 5 is supplied through an active carbon inlet 4 which is formed on the upper portion of the fluidized bed type adsorbing tower 1, so that the base active carbon 5 is filled within the fluidized bed type adsorbing tower 1 to a certain height above a sieve plate 6.

If the temperature of the TEDA vapor generating vessel 3 reaches near the required temperature level, a heated air is supplied through a preheating tube 7 and through an air inlet 8 of the TEDA vapor generating vessel 3. Then, the TEDA is speedily evaporated within the TEDA vapor generating vessel 3 owing to the diffusion and convection effects. Then, the evaporated TEDA vapor is mixed with the heated air, and the mixture is discharged through an air outlet 9 of the TEDA vapor generating vessel 3. Thus the heated air containing the TEDA vapor which has been discharged through the air outlet 9 of the TEDA vapor generating vessel 3 is supplied into the fluidized bed type adsorbing tower 1 through an air inlet 10 which is formed on the lower portion of the fluidized bed type adsorbing tower 1.

The heated air containing the TEDA vapor passes through holes 11 of the sieve plate 6 so as to contact with the active carbon which lies above the sieve plate 6. Thus, the TEDA vapor is impregnated into the active carbon. Under this condition, the amount of the heated air which is introduced through the air inlet 10 into the fluidized bed type adsorbing tower 1 is such that the active carbon is fluidized in the optimum fluidized velocity.

In the TEDA impregnating method in which the TEDA is vaporated and a fluidized bed is utilized as described above, the heated air and the TEDA vapor are supplied into the fluidized bed type adsorbing tower through its lower portion, so that the impregnant will be contacted with the active carbon above the sieve plate, thereby making the impregnation occur directly within the adsorbing tower through direct contacts.

Therefore, the impregnation into the active carbon is made with a uniformity in the impregnated carbon. Further, the impregnating solution is not used, and therefore, the impregnating process and the drying process do not have to be carried out separately. Further, the manufacturing period for the impregnated carbon is shortened as compared with other methods, and the active carbon immersing apparatus and the impregnating solution transporting means are not required. Consequently, the impregnation operation becomes simple.

EXAMPLE

A base active carbon having a size of 8 to 16 mesh was dried at oven of a temperature of 100° C. for 24 hours so as to remove the water component. The dried active carbon was filled in an amount of 50 g into a fluidized bed type adsorbing tower having a diameter of 3 cm, that is, filled above the sieve plate. At the same time, 2.5 g of a TEDA reagent which is used for the impregnating process was injected into the TEDA vapor generating vessel. Thereafter, the TEDA vapor generating vessel was maintained at 90°14 100° C., and at the same time, a heated air was injected. Thus, the heated air was made to contain a TEDA vapor, and this heated air containing the TEDA vapor was supplied into the lower portion of the fluidized bed type adsorbing tower, while maintaining the heated air at 90°–100° C. Thus the active carbon was made to be fluidized, and the active carbon was made to be impregnated with TEDA. The fluidizing and impregnating period was about 10 minutes.

The TEDA-impregnated active carbon manufactured in the above described manner was discharged from the fluidized bed type adsorbing tower. Then, five test samples of the TEDA-impregnated active carbon were randomly taken, and then, the weight of each was measured. The measured result showed that about 5% of TEDA was impregnated in average compared with the base active carbon.

Then TEDA was extracted from the TEDA-impregnated active carbon by using an acetonitrile solution, and then the test samples were subjected to an analysis by using a UV spectro-photometer. The result of the analysis showed that a 5% impregnation was realized on all of the test samples, and that a uniform impregnation was formed.

In order to confirm the quality of this TEDA-impregnated active carbon for a nuclear facility use, the test samples were subjected to an adsorption efficiency test based on the American Standard Test Method, ASTM D 3803-89 by using a radioactive organic iodide isotope. The test showed that the product of the present invention satisfied the requirement by 99.9% or more.

What is claimed is:

1. A method for manufacturing a active carbon impregnated with a triethylenediamine in a fluidized bed type adsorbing tower by generating a triethylenediamine vapor with heated air, the method comprising the steps of:

drying a base active carbon to remove a water component so as to obtain a dried active carbon;

filling said dried active carbon into said fluidized bed type adsorbing tower and to above a sieve plate;

injecting a reagent containing said triethylenediamine into a vessel for generating a triethylenediamine vapor;

supplying heated air into said vessel so as to generate a vapor of triethylenediamine mixed with said heated air; and supplying said heated air mixed with said vapor of triethylenediamine into the lower portion of said fluidized bed type adsorbing tower so as to make said base active carbon fluidized, whereby said vapor of triethylenediamine is impregnated into said active carbon with a fluidized carbon bed.

2. An apparatus for manufacturing a TEDA-impregnated active carbon in a fluidized bed type adsorbing tower by generating a TEDA vapor mixed with a heated air, the apparatus comprising:

a fluidized bed type adsorbing tower provided with an active carbon inlet for receiving a base active carbon;

a sieve plate provided with a plurality of holes, and disposed in the lower portion of said fluidized bed type adsorbing tower;

a TEDA vapor generating vessel connected through an air outlet to the lower portion of said fluidized bed type adsorbing tower, for supplying a TEDA vapor mixed a heated air; and a preheating tube connected through an air inlet to the upper portion of said TEDA vapor generating vessel, whereby said base active carbon is fluidized forming a fluidized bed, and said TEDA vapor is impregnated into said base active carbon.

* * * * *